Sept. 26, 1933.　　　D. D. HUBBELL　　　1,928,538
MULTIFOCAL LENS
Filed Nov. 19, 1931　　2 Sheets-Sheet 1

INVENTOR.
Daniel D. Hubbell.
BY
ATTORNEYS.

Sept. 26, 1933.     D. D. HUBBELL     1,928,538
MULTIFOCAL LENS
Filed Nov. 19, 1931     2 Sheets-Sheet 2

INVENTOR.
Daniel D. Hubbell.
BY
ATTORNEYS.

Patented Sept. 26, 1933

1,928,538

UNITED STATES PATENT OFFICE 1,928,538

MULTIFOCAL LENS

Daniel D. Hubbell, Columbus, Ohio

Application November 19, 1931
Serial No. 576,071

9 Claims. (Cl. 88—54)

My invention relates to multifocal lenses and the method of making the same. It has to do, particularly, with bifocal lenses. However, it is capable of application to lenses having more than two fields of vision.

One of the objects of my invention is to provide a bifocal lens formed in one piece wherein the near portion of the lens will be of such shape as to provide a range of vision of maximum width immediately beneath the dividing line between the distance field and the near field.

Another object of my invention is to provide a bifocal lens which fulfills the above-mentioned objects and which will have the distance and the near fields of such nature and so disposed as to ensure that there will be no "jump of the image" when the vision changes from one field to the other.

Another object of my invention is to provide a one-piece bifocal lens wherein the shoulder between the distance field and the near field is of minimum depth.

Another object of this invention is to provide a method of producing a one-piece bifocal lens which will accomplish the objects enumerated above and which will be simple and practicable for the making of such lenses commercially.

The bifocal lens which I have produced in accordance with my invention is made in one piece and embodies a distance field and a near field. The near field preferably comprises an area slightly greater than a half circle, with the upper edge thereof taking the form of a low, flat arc and with the lower semicircular portion bounded by one long and two short radius arcs. The optical center of the near portion is preferably slightly below the upper edge thereof but is in such relation to the center of curvature of the distance portion of the lens that the eye may readily shift from the near portion to the distance portion or vice versa without noticeable "jump of the image". Furthermore, the near portion is of such shape and so produced that the shoulder between this near portion and the distance portion is comparatively shallow. The method of producing a lens of this type will more clearly appear as this description progresses.

The preferred embodiment of my lens and the method of producing the same is shown in the accompanying drawings wherein.

Figure 1:
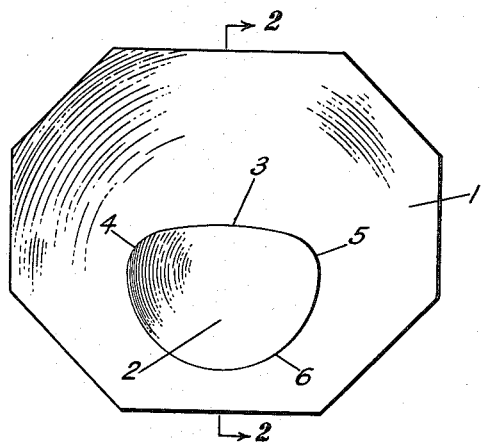
Figure 1 is a plan view of a finished bifocal lens embodying my invention.
Figure 2:
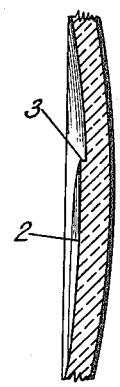
Figure 2 is a section taken on line 2—2 of Figure 1.
Figure 3:
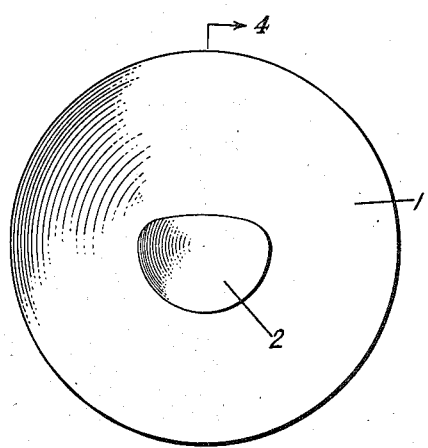
Figure 3 is a plan view of a finished lens blank embodying my invention.
Figure 4:
Figure 4 is a section taken on line 4—4 of Figure 3.

In the drawings, my invention is shown as embodying a bifocal lens having a distance portion 1 and a near portion 2. It will be noted that the near portion is integrally formed with the distance portion of the lens and that its upper edge takes the form of a long, flat arc 3 whose outer ends are joined by two short radius arcs 4 and 5 which are, in turn, joined to a substantially semicircular arc 6.

With this shape of near field, this line of juncture between the near field and the distance field at the upper edge of the near field is of comparatively extended length. One result of this is that the upper portion of the near field, which is the portion most commonly used, is of comparatively greater width, this being an obviously desirable characteristic.

Figure 8:
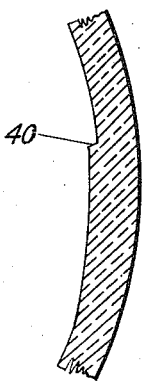
Figure 8 is a sectional view of a modified form of my lens blank.

A modified form of my invention is shown in Figure 8. In this form, the slight ledge 40 which separates the near field from the distance field is inclined so that it forms an obtuse angle with the surface of the near field and also with the surface of the distance field. This beveled or chamfered construction is advantageous under certain conditions.

Another result which arises from the use of a near field of the shape indicated or of a shape which involves a comparatively long upper dividing line between the distance field and the near field is that, with a one-piece bifocal, it is possible to provide a "no jump" lens whose shoulder, at this dividing line, is of minimum depth.

A still further advantage which arises from the use of this, or approximately this, shape of near portion, is the fact that the lower edge of the near portion may be caused to merge with the distance portion so as to produce a smooth surface at this line of juncture of the near portion and the distance portion while, at the same time, "jump of the image" is avoided.

Another problem which I overcame in the making of this invention has to do with a method which I have devised for producing a lens. This method involves the idea of rotating a grinding tool in contact with the lens blanks to grind the distance surface of the lens and simultaneously creating such relative translatory movement between the lens blank and the rotating grinding lap that this lap traces an eccentric path upon the blank, with the inner boundary of this path forming the outer boundary of the near portion of the lens.

Figure 7:
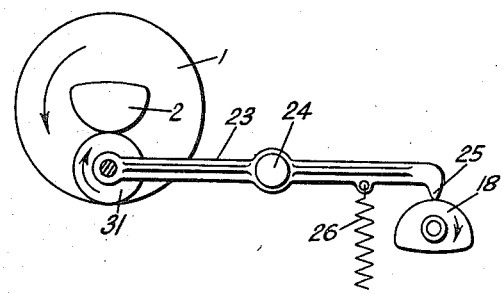
Figure 7 is a diagrammatic plan view of the structure shown in Figure 6.
Figure 6:
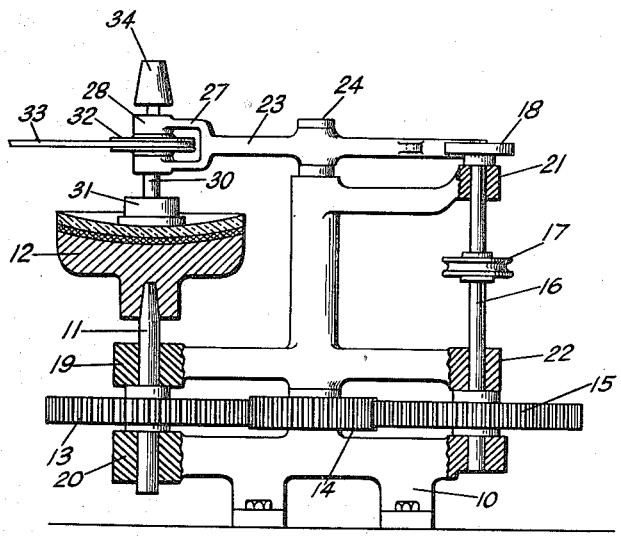
Figure 6 is a diagrammatic view, in elevation, of apparatus which may be used in grinding the lens blank.

The apparatus which is used for so grinding the distance portion may take various forms. In Figures 6 and 7, it is shown as comprising a base 10 which carries at one end thereof a spindle 11 which carries a blank support 12 rigidly mounted upon the upper end thereof. The spindle 11 has a gear 13 rigidly mounted thereon and this gear 13 is in mesh with an idle gear 14 which is also in mesh with a gear 15 upon the driving shaft 16. The driving shaft 16 may be rotated in the direction of the arrow by means of a pulley 17 and a belt (not shown). The driving shaft 16 is further provided at its upper end with a cam 18 which is rigidly connected thereto. It will be seen that the rotation of the driving shaft 16 effects rotation of the blank support 12 and simultaneous rotation of the cam 18.

Suitable bearings are provided for the spindle 11 and the driving shaft 16. The bearings 19 and 20 rotatably support the spindle 11 and the bearings 21 and 22 rotatably support the driving shaft 16.

Disposed for cooperation with the cam 18, is a cam lever 23 which is fulcrumed at 24 and which has an end 25 thereof maintained in contact with the periphery of the cam 18 by means of a tension spring 26, in a manner that will be apparent from Figure 7.

The opposite end is bifurcated as at 27 to form spaced bearings 28 and 29 for the reception of a spindle 30 which is designed to rigidly carry the lens-grinding lap 31 at its lower ends. In between the bearings 28 and 29, the spindle 30 preferably carries a pulley 32 which may be driven by a belt 33. If desired, a suitable weight structure may be disposed upon the upper end of the spindle 30 as shown at 34 so as to effectively press the lens-grinding lap downwardly upon the blank to be ground.

Figure 5:
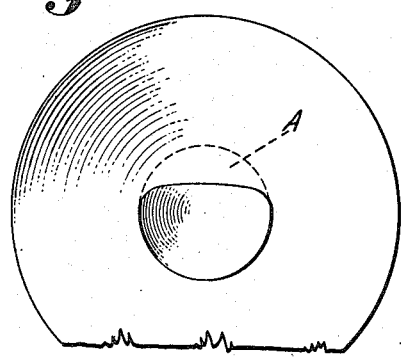
Figure 5 is a plan view of a lens blank embodying my invention and illustrating a mat which is preferably used during the grinding of the near field so as to protect the distance field during this grinding operation.

In the operation of grinding the lens blank to form a lens, the distance field is, preferably, first ground to proper depth by the apparatus shown in Figures 6 and 7. The inner circumference of this field is determined by the eccentric path of the grinding operation which is controlled by the cam operation of the lever 23. In subsequently grinding the near field, the raised portion of the blank which comprises the eccentrically formed near field, is, preferably, supplemented by a mat of glass which is cemented to the main lens in the area A (Figure 5). This mat is of proper shape and height to complete the plateau formed by the near field and to complete the circle of which this near field forms the major part. Thus, in the grinding of the near field, the grinding tool, where it would otherwise overlap and tend to injure the upper edge of the near field, will merely be supported, partly by the said mat, which will prevent wobbling of the tool, will prevent injury to the upper edge of the near field and will prevent injury to the distance field.

It will be seen that I have provided a novel type of lens comprising several important characteristics. In the first place, the near portion of this lens has its optical center sufficiently close to the point of vision entrance to avoid "jump of the image". In the second place, that edge of the near field which contains the point of vision entrance, is in the form of a long flat arc or approximately a straight line so that a wide range of vision within the near field and along this edge thereof is ensured. Furthermore, such ledge as is formed on that side of the near portion containing the point of vision entrance decreases on departure from the normal point of vision entrance. Furthermore, the other side of this near portion, with the exception of the extremely limited radial arcs, is entirely merged with the surface of the distance portion. Thus, there is produced a one-piece bifocal "no jump" lens wherein the shoulder or ledge between the near portion and the distance portion is of minimum height, while the major portion of the edge of the near portion is merged with the distance portion, so that the lens is not only effective but sightly.

Wherever, in this description or claims, reference is made to upper or lower edges of the respective fields of vision, it is intended to refer to inner or outer edges which are the equivalent thereof in lenses having two or more fields of vision.

It will also be apparent that I have provided a novel type of one-piece bifocal lens which will have numerous advantages, as indicated above. It will also be seen that I have provided a simple and effective method and apparatus whereby this lens may be readily made, and upon a commercial scale.

It will also be understood that the various features of this lens and the method and apparatus for producing it are readily applicable to multifocal lenses having more than two fields of vision, although I have mainly described them with reference to bifocal lenses for the purpose of simplifying the explanations thereof.

Having thus described my invention, what I claim is:

1. A multifocal ophthalmic lens formed in one piece and comprising a distance field and a near field disposed entirely within said distance field, said near field comprising a segment greater than a semi-circle, with the upper edge thereof taking the form of a low, flat arc, and with the lower portion thereof being bounded by a semi-circular arc which is connected to said flat arc by two short arcs.

2. A multifocal ophthalmic lens formed in one piece and comprising a distance field and a near field disposed entirely within said distance field, said near field comprising a segment greater than a semi-circle, with the upper edge thereof taking the form of a low, flat arc, and with the lower semi-circular portion bounded by one long arc and merging with the distance field along such long arc, and two short arcs connecting said flat arc to said long arc.

3. A multifocal ophthalmic lens formed in one piece and comprising a distance field and a near field disposed entirely within said distance field, said near field comprising a segment greater than a semi-circle, with the upper edge thereof taking the form of a low, flat arc, and with the lower portion thereof being bounded by a semi-circular arc joined to the said flat arc by two short arcs, said near field having its optical center nearer to the upper edge than to the lower edge thereof.

4. A multifocal ophthalmic lens formed in one piece and comprising a distance field and a near field disposed entirely within said distance field, said near field comprising a segment slightly greater than a semi-circle, with the upper edge thereof taking the form of a low, flat arc, and with the lower portion thereof being bounded by a semi-circular arc joined to the said flat arc by two short arcs, said near field having its optical center nearer to the upper edge than to the lower edge thereof, and having a portion of its edge merging with said distance field.

5. A multifocal ophthalmic lens formed in one piece comprising a distance field and a near field, said near field comprising a segment less than a full circle, with a flat upper edge and with a lower portion which is bounded by a semi-circular arc which is joined to said flat upper edge by two short arcs, said nearer field having a portion of its upper edge merging with said distance field, and said near field having its optical center slightly below the upper edge thereof.

6. A multifocal ophthalmic lens formed in one piece and comprising a distance field and a near field, said near field comprising a segment less than a full circle, with a flat upper edge and with a lower portion which is bounded by a semi-circular arc connected to said flat upper edge by two short arcs, said near field having its optical center slightly below the upper edge thereof.

7. A one-piece multifocal ophthalmic lens comprising a major lenticular surface having a selected radius of curvature and a minor lenticular surface having a different radius of curvature, both of said surfaces being generated on the same side of the lens, said minor lenticular surface being less than a full circle with a vertical dimension greater than a radius of the circle but less than the diameter of the circle and having an edge which is elongated and substantially flat and another edge simulating a semi-circular arc connected to said flat edge, said minor lenticular surface being so disposed with relation to said major lenticular surface that the edge which is elongated and substantially flat is more remote from the peripheral boundary of the lens than the edge simulating the semi-circular arc thereby eliminating the jump of the image when the vision changes from one field to the other.

8. A lens blank for making a one-piece multifocal ophthalmic lens comprising a major lenticular surface having a selected radius of curvature and a minor lenticular surface having a different radius of curvature, both of said surfaces being generated on the same side of the lens, said minor lenticular surface being less than a full circle with a vertical dimension greater than a radius of the circle but less than the diameter of the circle and having an edge which is elongated and substantially flat and another edge simulating a semi-circular arc connected to said flat edge, said minor lenticular surface being so disposed with relation to said major lenticular surface that the edge which is elongated and substantially flat is more remote from the peripheral boundary of the lens than the edge simulating the semi-circular arc thereby eliminating the jump of the image when the vision changes from one field to the other.

9. A lens blank for making one-piece multifocal ophthalmic lens comprising a major lenticular surface having a selected radius of curvature and a minor lenticular surface having a different radius of curvature, both surfaces being generated on the same side of the lens, said minor lenticular surface having a contour greater than a semi-circle but less than a full circle with a substantially flat upper edge and a lower edge including a semi-circular arc connecting to said flat upper edge by two short arcs.

DANIEL D. HUBBELL.